United States Patent
Albert

[15] 3,662,384
[45] May 9, 1972

[54] DOPPLER MAPPING RADAR

[72] Inventor: Joseph J. Albert, Timonium, Md.
[73] Assignee: Martin-Marietta Corporation
[22] Filed: Mar. 13, 1957
[21] Appl. No.: 645,862

[52] U.S. Cl.................................................343/9, 343/6.5
[51] Int. Cl.................................................G01s 9/44
[58] Field of Search..........................343/5, 6, 8, 9, 6.5, 10; 214/10; 244/14

[56] References Cited

UNITED STATES PATENTS

| | | |
|---|---|---|
| 2,423,023 | 6/1947 | Hershberger..............................343/8 |
| 2,535,274 | 12/1950 | Dicke.........................................343/9 |
| 2,547,945 | 4/1951 | Jenks.........................................343/6 |
| 2,581,847 | 1/1952 | Espenschied et al. ....................343/9 |

Primary Examiner—Rodney D. Bennett, Jr.
Assistant Examiner—Brian L. Ribando
Attorney—Julian C. Renfro

[57] ABSTRACT

A system is disclosed for mapping terrain from a vehicle in which the area to be mapped is resolved into strips by rotating a narrow fan shaped beam with the velocity vector of the vehicle the approximate center of the scanning system. The reflected energy is multiplied by a reference signal to generate a doppler spectrum which is resolved into elements of area along the strip determined by the antenna pattern by applying the spectrum to a bank of graduated filters. The beam of an indicating device is swept along the radius of the device with the output of the filters used as an intensity control.

15 Claims, 9 Drawing Figures

PATENTED MAY 9 1972 3,662,384
SHEET 1 OF 3
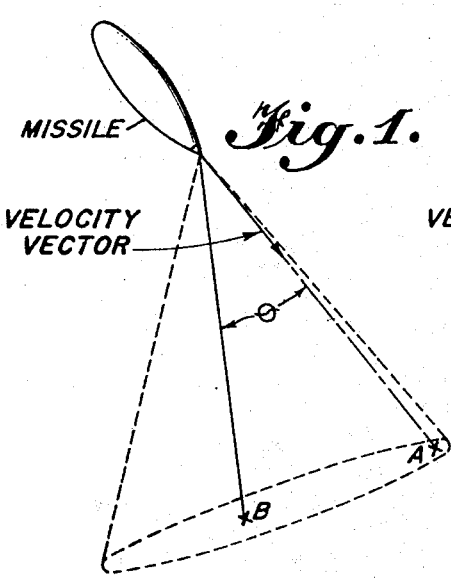
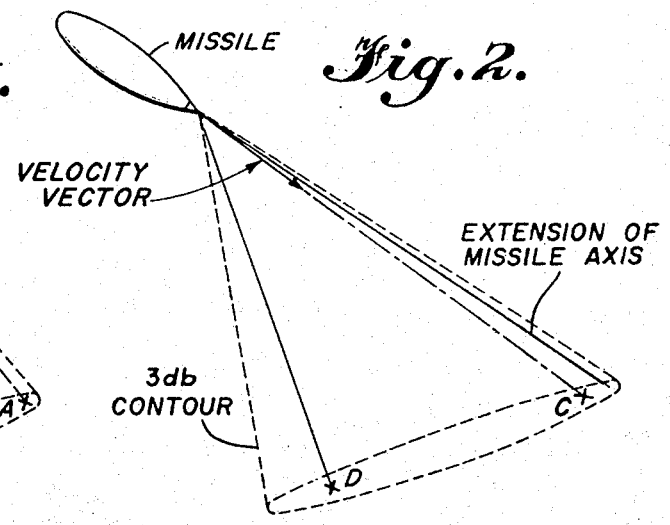
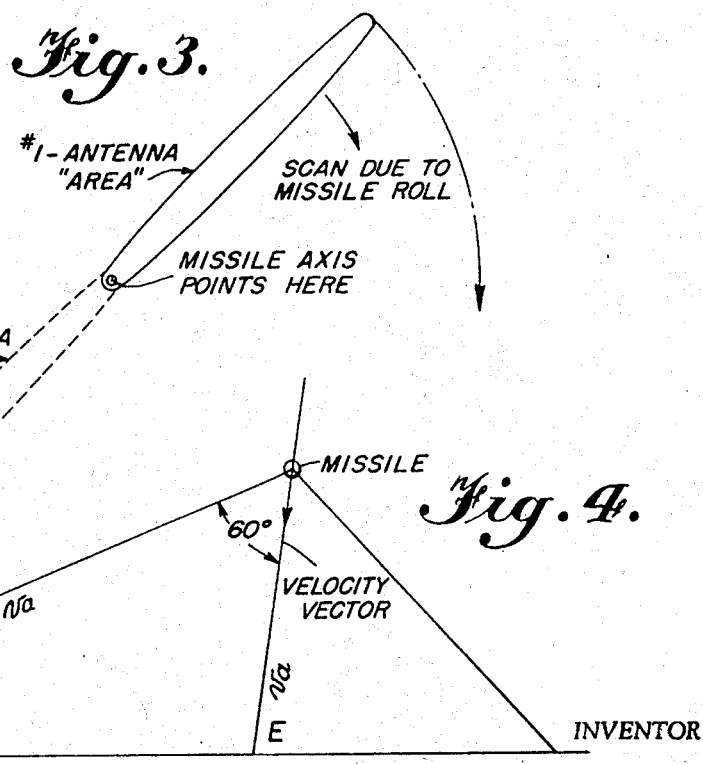
INVENTOR
Joseph J. Albert
BY Julian C. Renfro
ATTORNEY

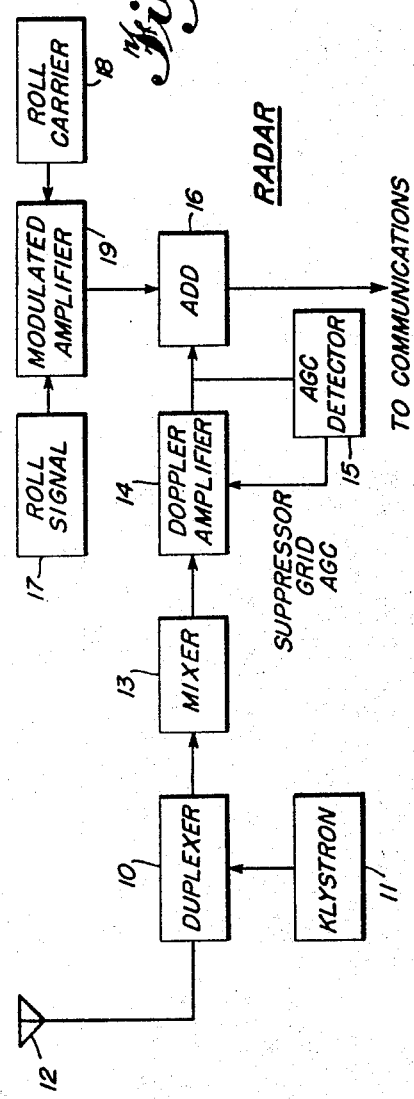
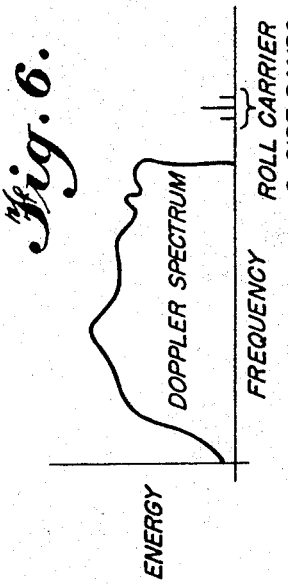
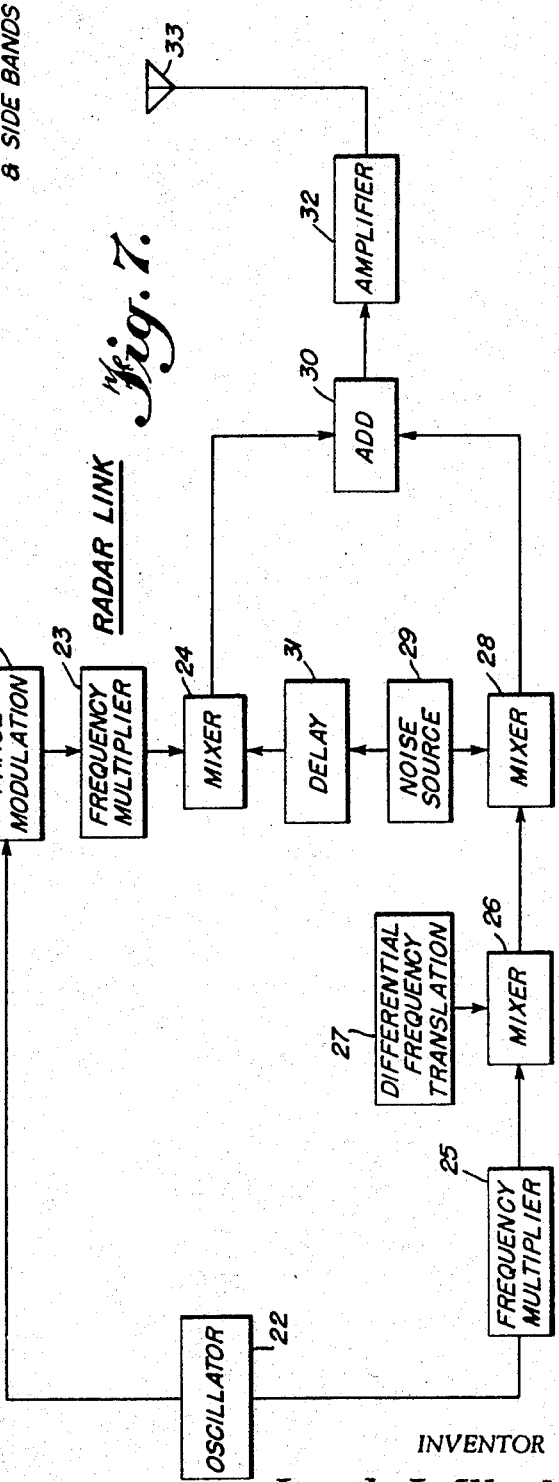

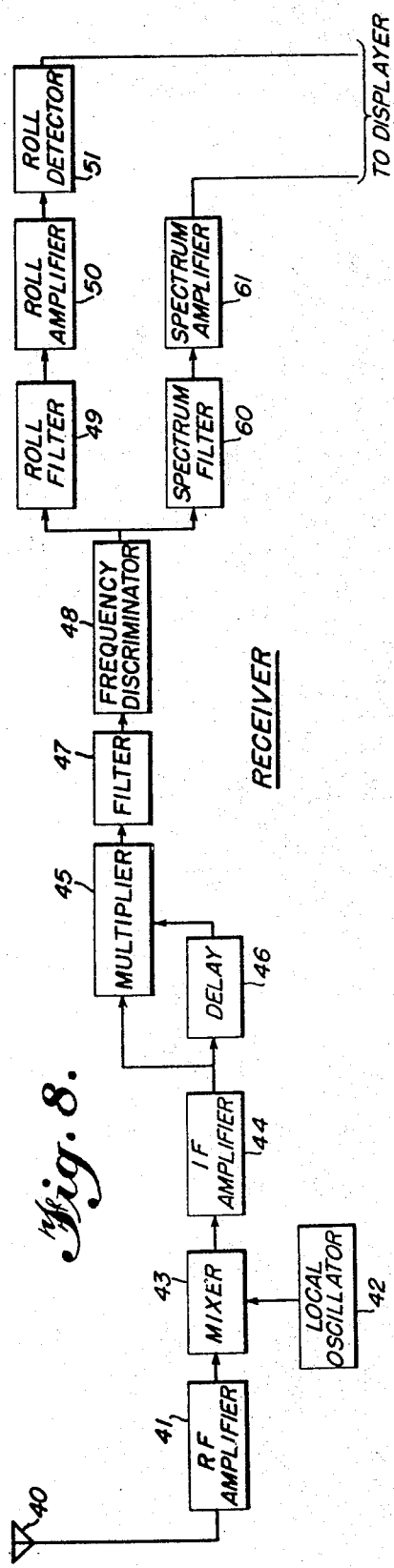
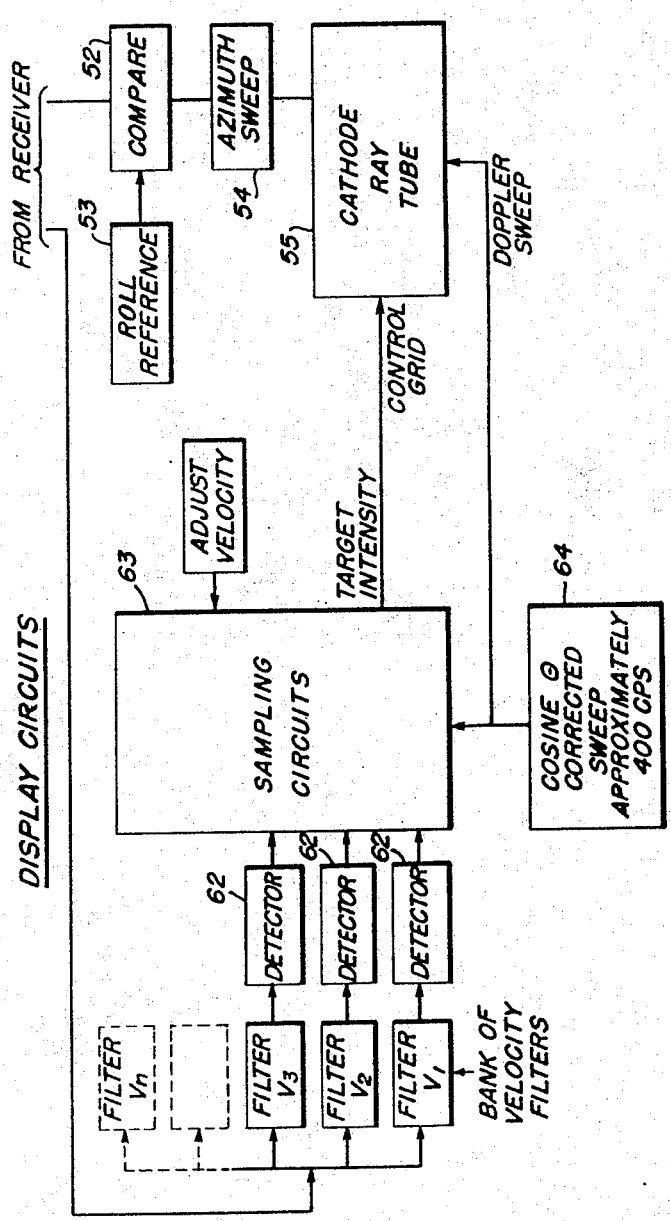

DOPPLER MAPPING RADAR

The present invention relates to a sensing system for providing a picture of the terrain in the vicinity of an airborne vehicle, and more particularly to a system particularly useful for providing information to an operator in a remote location so that he can provide corrections, via a command link, to a missile to establish its terminal phase of guidance.

Many systems have been developed for transmitting information from a missile in flight back to a remote station such as a ground station or launch plane. The information is essentially comprised of what the missile "sees". The more common of such systems employs one form of television camera located in the nose of the missile for the purpose of taking a "picture" in the direction of the missile heading. Although this system has enjoyed limited success, one of its main drawbacks is that the camera is not necessarily pointed in the direction of the instantaneous line of flight, along the velocity vector of the missile. This is especially true when the missile is turning onto a different course, for due to its momentum at these times, it will travel in a "crab-like" manner, which results in the television camera pointing in a direction different from that of the instantaneous line of travel.

According to this invention, the disadvantages inherent in this manner of using a television camera are overcome, by providing means to produce information related to the direction of the instantaneous line of flight of the missile. A unique system is employed to collect microwave energy by the use of at least one rotating fan-like pattern, and circuitry is advantageously provided to differentiate between places on the terrain, based upon the difference in frequency of the electromagnetic energy reflected by different areas or elements of the terrain. A coordinate system is formed by combining this kind of differentiation with differentiation via the so-called "beaming" of antenna patterns. The combined knowledge of the direction in which the energy collecting beam is pointed, and the frequency relationship which obtains along the reflecting strip as a consequence of the velocity of the collecting antenna is used to create a "picture" of the terrain.

Doppler is advantageously used to resolve elements along an azimuth strip, and the scan and the sampling are related in a definite manner by virtue of the fact that the doppler frequency is a function of the cosine of the angle off the velocity vector. The doppler effect is responsible for two important factors: firstly, the picture information inherently is in a narrow band permitting realization of a picture link having military characteristics, and secondly, since the picture is hooked to or determined by the velocity vector, considerable motion of the collecting antenna can be tolerated without deterioration of the picture. This, of course, means that a fixed antenna of a longer dimension than can otherwise be utilized is made possible, hence better directivity. If the roll of the missile is utilized to scan the antenna, the fan-shaped antenna beam sweeps about the instantaneous line of flight of the missile, and illuminates areas on the ground when the missile is in a dive.

Illumination from the missile itself can be satisfactorily performed, but this type of illumination is not a necessity. For example, the "hydrogen line" could constitute the illumination, or illumination by radiators located in other vehicles could be used. For long range flights, for example, illumination from the launch plane might be desirable, for a higher powered transmitter could be carried therein and the geometry of the situation can render launch plane velocity of little consequence.

A particular form of this invention utilizes a simple C.W.- doppler radar, and different elements of area along the azimuth strip are differentiated by virtue of their different velocities with respect to the descending missile. The velocity of points on the ground with respect to the missile is a function of the cosine of the angle off the velocity vector. The doppler spectrum generated by any azimuth strip is a relatively narrow band of frequencies (approximately 50,000 cycles wide) which can consequently be sent to the launch plane or ground station along with roll information over a simple communication link which has military characteristics (wide bandwidth in the channel can be traded for signal-to-noise ratio in the "picture" or doppler band). A transmitted reference noise link may be similar in basic principle to that described in my copending application entitled "COMMAND CONTROL SYSTEM" filed Jan. 22, 1957, Ser. No. 635,533. A stored reference noise link is also possible.

In the launch aircraft or ground station, indicator means are employed so that an operator can view the picture and issue commands to correct the terminal flight of the missile. In the indicator means, which may be a cathode ray tube, for example, roll information determines the angle of the trace on a cathode ray tube and frequency is displayed along the radius, starting at the center with the highest frequency of the doppler spectrum. The maximum frequency is that returned by the portion of ground at which the missile velocity vector is pointing so that the center of the picture indicates the target which the missile is expected to hit. It will be noted that the picture is as stable as the velocity vector.

Referring now to the fundamental considerations associated with this invention, in order to differentiate between areas on the ground based on their doppler shift, it is necessary to differentiate between doppler signals which are close together in frequency. In at least two X band seeker systems, the doppler spectrum generated by a discrete target has been found to exist within a 500 cycle bandwidth, and this bandwidth has been used for doppler tracking filters. This means that frequency stability of the source of energy has been found to be at least this good during the time that signals take to travel to target and back again. Fortunately, 500 cycle resolution at X band is roughly the resolution desired, and over much of the target complex, it is equivalent to about 1° resolution measured off the velocity vector. Consequently, measurements made in the radar seeker field constitute experimental verification of a critical phenomenon upon which this invention depends. Furthermore, the spectrum generated by scanning a 1° antenna "beam" over a discrete target in 1/360th of a second is roughly 500 cycles wide.

Desirable resolution and scanning spectrum widths are approximately equal to the resolution in doppler which has been realized in the radar seeker field. Consequently, the present doppler mapping radar invention has the great advantage of being practical with only the utilization of comparatively simple existing components. Due to the fact that the doppler shift is proportional to the cosine of the angle off the velocity vector, 500 cycle resolution at X band corresponds to roughly 5° resolution at the target. This can be improved, however, by utilizing a more stable and higher antenna frequency (which also minimizes antenna dimension) and by utilizing narrower filters for the higher doppler frequencies. In connection with resolution, it is to be noted that large variations in roll rate are undesirable in that the "optimum" distribution of filter bandwidths would then be impossible and CR tube persistence would be a problem.

Referring now to the picture link, the width of doppler spectrum generated at microwave frequencies by velocities of 1,000 miles per hour is in the neighborhood of 30 to 100 kilocycles. Since the amplitude over any 500 cycle interval depends on the reflectivity of the corresponding area on the ground, amplitude must be preserved when transmitting the spectrum to the launch aircraft or ground station. Furthermore, non-linearity in the link would degrade overall performance to some extent, and consequently a relatively high fidelity link is desirable. Fortunately, since the doppler band is rather small, a link having military characteristics is quite possible. Narrow Band FM of the difference frequency is the modulation technique indicated in the fundamental block diagram of the drawings.

As to the roll rate utilized for obtaining the display, a roll rate of 500° to 800° a second is probably adequate if two antenna beams are used, since the missile velocity is not so great that the picture is changed radically between scans when the missile is below 10,000 feet altitude. It is to be noted that too high a scan rate is undesirable because the doppler filters which differentiate elements of area along the illuminated strip may not respond fast enough to permit realization of the azimuth resolution possible with a narrow beam.

A mapping radar arrangement according to this invention is particularly adapted for use in a small vehicle, and permits the use of a fixed antenna so that a long dimension and hence directivity can be realized. Such a radar is extremely simple and lends itself to the use of a remote station by virtue of the fact that the picture information is inherently in a narrow band of frequencies. Therefore, the link to the remote station can be relatively immune to jamming. The use of the present invention provides a number of distinct advantages over prior art arrangements, for not only is the complex circuitry of prior art television camera schemes eliminated, but also the sending of picture information to a remote location is made possible, which hitherto has been very difficult. The sensing circuitry depends on or is associated with the velocity vector, making possible the use of a long antenna fixed to the airframe. As previously mentioned, such antenna can be subjected to considerable motion without causing deterioration of the picture, and makes possible directivity which could not be realized with a stabilized antenna.

A mapping system according to this invention, when utilized in conjunction with a vehicle traveling relatively to a portion of the surface of the earth that is illuminated by electro-magnetic energy may comprise a collecting antenna having a narrow fan-shaped amplitude pattern arranged to collect in the form of strips, energy reflected from the portion of the surface of the earth. Means are provided for rotating the antenna pattern with the velocity vector of the vehicle as the approximate center of rotation, and means are also provided for differentiating elements along each strip on the earth's surface determined by the antenna pattern. This differentiation takes place by virtue of the difference in velocity hence frequency of the elements along the strip, these differences in frequency existing as a consequence of the velocity of the vehicle with respect to the area being mapped. Means are also provided for displaying the output of the differentiating means along different radii of an indicator, the radii being determined by the angular position of the collecting antenna pattern.

The differentiating means and indicator means associated with the foregoing mapping system may be at a remote location, the remote location being coupled to the vehicle by means of a link functioning to transmit to the remote location, the doppler spectrum corresponding to the energy collected along a strip on the earth determined by the antenna pattern and the rate of rotation of the antenna pattern. However, if the remote location has prior knowledge as to the rate of rotation of the antenna pattern, only the doppler spectrum corresponding to the energy collecting along a strip need be transmitted by the link.

In the event that the present mapping system is to be used in conjunction with a vehicle that performs its own illumination of the portion of the surface of the earth to be mapped, the mapping system comprises means to direct a beam of microwave energy over an area on the earth's surface.

Additionally, in the present mapping system means may be employed to convert the spectrum at antenna frequency to a lower frequency through the use of a reference frequency and a non-linear device. As to the differentiating means of the mapping system according to this invention, this may comprise a bank of graduated filters to resolve the doppler spectrum into its constituent components, and the indicator means may comprise sampling circuits to sample the output of the filters simultaneously with the deflection along the radius of an indicator. This indicator means may include means for indicating the intensity of the signals from the filters in the form of the brightness of the beam of electrons that describe the radius of the indicator.

A method of mapping terrain from a vehicle employing this invention and traveling relatively to the terrain may involve the steps of resolving the area to be mapped into segments by virtue of the antenna pattern of the antenna system, and resolving along the segments by virtue of the differences in doppler frequency among the elements of the segments. More particularly, the method can comprise the steps of resolving the area to be mapped into strips by rotating a narrow fan-shaped beam with the velocity vector of the vehicle as the approximate center of rotation of the scanning system, multiplying the reflected energy and a reference signal to generate a doppler spectrum in the vehicle, operating upon the doppler spectrum in order to resolve elements of area along the strip determined by the antenna pattern by applying the spectrum to a bank of graduated filters which select elements along the strip, sampling the amplitude at the output of the filters and using this output as an intensity control on an indicating device, the beam of the indicating device being swept along the radius of the device starting at the center as the highest frequency filter is sampled, and progressing to the circumference as the lower frequency filters are sampled.

Other objects, features and advantages of the present invention will become more readily apparent from the following detailed description of preferred embodiments of the present invention when considered in conjunction with the appended drawings in which:

FIG. 1 illustrate schematically a missile generally in a dive attitude, in which the long axis of the missile and the velocity vector of the missile are in line, this figure also showing the appropriate projection of the 3db contour of the narrow fan-shaped pattern associated with the fixed antenna mounted on the missile;

FIG. 2 is a schematic showing of a missile much like FIG. 1, but with the missile traveling in somewhat a "crab-like fashion" in which the velocity vector is not in alignment with the longitudinal axis of the missile;

FIG. 3 illustrates schematically a plan view of the projection of the antenna patterns of the missile upon the earth, this figure differing from the embodiment of FIGS. 1 and 2 in that two antennas rather than one antenna are being utilized;

FIG. 4 illustrates graphically the manner in which doppler shifts are achieved from the energy reflected from two different points on the earth with respect to the missile;

FIG. 5 illustrates in block diagram the equipment utilized in the missile for sensing target complex and developing the doppler spectrum and roll information;

FIG. 6 graphically portrays the doppler spectrum and roll carrier and side bands;

FIG. 7 illustrates in block diagram a portion of the radar link, and more particularly the transmitting portion of the link;

FIG. 8 shows in block diagram the type of receiving equipment that may be used at a remote location, such as at a ground station or in a launch aircraft; and FIG. 9 illustrates in block diagram the display circuit associated with this mapping system for obtaining a pictorial representation from the doppler spectrum and roll information.

In the embodiment about to be described in detail, illumination of the ground is accomplished by the vehicle. However, it is to be understood that the ground may be illuminated by a source external to the vehicle, such as from a remote launch plane or even an extra-terrestrial source.

Referring now to the drawings, the missile in FIG. 1 is illustrated generally in a dive attitude with two points A and B on the surface of the earth lying within the energy pattern transmitted from a single fixed antenna mounted on the missile. As an example, this fixed antenna may be mounted along the leading edge of an aerodynamic surface of the missile. As will be noted from this figure, the amplitude pattern of the antenna is substantially fan-shaped in a plane containing the missile axis, and is sufficiently narrow that the microwave energy falls on an elongated strip on the earth's surface.

In FIG. 1, the missile is pointed in the same direction as it is moving, or in other words, the long axis of the missile and the velocity vector of the missile are in alignment. In these circumstances, an extension of the missile axis lies just inside one edge of the rotating fan-shaped pattern of microwave energy transmitted from the fixed antenna mounted on the missile. Thus, energy reflected from point A, which is directly in line with the velocity vector, will have a higher doppler frequency than energy reflected from point B, which is at an angle θ with respect to the velocity vector. By certain components, described more fully hereinafter, the different elements of area along the azimuth strip defined by the antenna pattern are differentiated from each other by virtue of the different apparent frequency reflected from these elements of area with respect to the missile, or in other words, by the doppler shifts the elements of area produce.

In FIG. 2, the point C on the surface of the earth is in direct alignment with the velocity vector of the missile, and this point is offset somewhat from a projection of the missile axis. Nevertheless, the energy reflected from point C in alignment with the velocity vector will have a higher doppler frequency than the energy reflected from any other point on the surface of the earth.

In FIG. 3, a slightly different embodiment of this invention is involved, for in this figure, the energy patterns resulting from the use of two fixed antennas on the missile are illustrated. Fixed antennas are used in order to achieve a long dimension, hence directivity, and scanning is obtained by missile roll. Accordingly, the beams or energy patterns will actually rotate about the point at which the long axis of the missile is aimed, and rotate at the same speed as the missile is rolling. This technique is particularly useful for vehicles which experience a relatively small displacement between missile axis and velocity vector.

In an embodiment in which the missile performs its own illuminating, the microwave energy is generated in the missile from a simple C.W.-doppler radar, and as previously mentioned, the different elements of area along the azimuth strip defined by the antenna pattern are differentiated from each other by virtue of the doppler shifts the elements of area produce. It is to be appreciated that the velocity of points on the ground with respect to the missile will be a function of the cosine of the angle they bear off the velocity vector. This is illustrated in FIG. 4 for an angle of 60°. In this figure, the point E is in alignment with the velocity vector of the missile, and the point F is at a 60° angle with respect to the velocity vector. In this relation, the relative or apparent velocity at point F with respect to the missile is only half of the apparent velocity at point E.

It has been found that the doppler spectrum generated by an azimuth strip such as described in relation to FIGS. 1 through 3 can by design be a relatively narrow band of frequency. With the present invention, a band of approximately 50,000 cycles width has been found useful. In the event the missile is not a military vehicle, this doppler information can be transmitted to a remote station such as to a launch plane over any high fidelity communication link. In the embodiment herein described, however, a link having military characteristics is employed. At the remote station, the transmitted information is received, and if roll information was transmitted, such information is used to determine the azimuth of angular sweep of a trace on an indicating device, such as a cathode ray tube, and frequency (the doppler spectrum) is displayed along the trace radius, starting at the center of the tube with the highest frequency of the spectrum. The maximum frequency will be that energy returned by the spot on the ground at which the missile velocity vector is aimed. This spot is not necessarily the same as that at which the long axis of the missile is aimed, but it may be. As a consequence, the center of the picture is displayed on the cathode ray tube so as to always indicate what the missile is expected to hit, if the center of the picture is not in motion.

Referring now to FIG. 5, there will be described in some detail the equipment mounted on the missile necessary to perform the various functions of the present invention. The equipment is comprised of the conventional parts of a CW doppler radar including a duplexer 10, a klystron 11, fixed antenna 12, and mixer 13. The microwave energy transmitted from antenna 12 is reflected by the ground, to antenna 12 and passed via duplexer 10 and mixer 13 to doppler amplifier 14 operated with suppressor grid automatic gain control as indicated by the AGC detector 15 and legend. The output from doppler amplifier 14 is passed to an adding circuit 16 which also receives a roll signal. The roll signal is derived from the motion of the missile itself as it travels through the air. The missile rotates as it moves and consequently the antenna 12 scans a circular path. The roll signal developed originates in roll signal device 17 and relates directly to the rotation of the missile. Roll signal device 17 may be a roll reference gyro designed to furnish a reference in inertial space relatable to the angle between the roll position of the missile and the unchanging position of the inertial reference. The roll reference gyro may, for example, take the form of a spring wound gyro such as manufactured under the Summers U.S. Pat. No. 2,732,721, issued Jan. 31, 1956. Alternatively it may be an electrical gyro such as manufactured by Whittaker Gyro, Division of Telecomputing Corporation, Van Nuys, California; manufacturers part number 500617, Ser. No. 55-50, a shelf item available since 1955. A suitable roll carrier is generated in block 18 by conventional oscillating circuits and the roll signal from block 17 is used to modulate this roll carrier in conventional circuitry as indicated by block 19. The doppler spectrum is maintained separate from roll information at all times. This is easily achieved by having the roll carrier preselected to be a frequency above the highest frequency of the doppler spectrum. Thus, the roll carrier and other side bands are at frequencies higher than the highest frequency in the doppler spectrum. This is illustrated graphically in FIG. 6 where the energy of all signals is plotted against frequency.

With the information in this form according to this embodiment, it is now ready to be transmitted to a remote station, such as a launch plane. The information is passed from the radar unit to the transmitting portion of a communication link by means of any suitable transmission line. Any high fidelity technique can be used to transmit the information including such well known means as frequency, amplitude, or phase modulation. If, however, circumstances require the information transmitted to be kept confidential, this can be accomplished utilizing an advanced communication link having the proper military characteristics such as transmitted reference Nomac or stored reference Nomac.

As previously mentioned, for the purpose of the present invention there will be described an advanced military communication link to show how the transmitted information can be transmitted and received with the reduced possibility of detection or jamming.

The information to be transmitted is received in phase modulation circuitry included in block 20. A suitable carrier frequency originating from oscillator 22 is also admitted to block 20. The output from the phase modulation is frequency multiplied in block 23 and then passed to mixer 24. The output from oscillator 22 is also frequency multiplied in block 25 and then passed into a mixer 26 wherein it is mixed with a difference frequency translation signal originating in block 27. The purpose of block 27 is to provide a signal that when mixed with the output of frequency multiplier 25 produces a signal that differs only slightly in frequency from the output of frequency multiplier 23. The output from mixer 26 is fed to a mixer 28 wherein it is mixed with narrow band noise originating from noise source 29. The output from mixer 28 passes to adding circuits 30. The output from noise source 29 is also introduced into a delay line 31 after which it goes to the mixer 24 the output of which also passes to the adding circuits 30. The information is now in a condition to be broadcast or transmitted after amplification which is attained in block 32. The broadcast or transmission is achieved via antenna 33. As will be evident from the above description of the communication link, the effect is that of having the doppler spectrum modulate the difference frequency of the transmission system.

All of the equipment thus far described can be located on the missile. It will be appreciated, however, that there are no unusual requirements for the equipment either from a size or availability standpoint and that the full equipment can be put up compactly at a relatively low cost.

The equipment located at the remote station according to this embodiment basically includes a receiver and display circuits. In FIGS. 8 and 9, a preferred form of the apparatus located at the remote station is illustrated. Referring first to FIG. 8, the broadcast or transmitted information is picked up by antenna 40 and passed to RF amplifiers 41, the output of which is beat against the fixed frequency signal of a local oscillator 42 in mixer 43, for the purpose of converting from the radio frequency to an intermediate frequency. The output of mixer 43 then passes through an IF amplifier in block 44, the output of which is fed to a multiplier 45, and also through a delay line 46 to multiplier 45. The output from multiplier 45 passes through a filter 47. The object of delay line 46, multiplier 45 and filter 47 is to work a correlation detection upon the composite noise signal transmitted and to generate or derive the difference frequency upon which has been modulated the message (doppler spectrum and roll information). Accordingly, the filter 47 is set to pass only the difference frequency band. A frequency discriminating circuit 48 receives the output of filter 47 and generates the doppler spectrum and roll carrier and sidebands. Separation of the doppler spectrum and roll information is achieved via filters 49 and 60. The modulated roll carrier signal passes through filter 49 and is amplified in block 50. The roll carrier is eliminated by roll detector 51. The roll information now free of its carrier, is passed to the display circuits of FIG. 9 and specifically to a comparator circuit 52 wherein it is compared with a roll reference signal originating in block 53. This roll reference signal may be obtained from a roll reference gyro, such as the aforementioned Summers or Whittaker gyro. The roll reference signal and the comparison therewith is necessary since it determines the orientation of the picture. The roll reference signal is generated by apparatus set in operation when the missile is launched and thus serves as a means for determining the orientation of the missile while in flight. The output from the comparing circuits 52 pass to azimuth sweep circuits and are used to control the circular sweep of a cathode ray tube 55.

The doppler spectrum passes through spectrum filter 60 as previously mentioned, to amplifying circuits 61 and then to a bank of velocity filters V1, V2, V3 ... Vn. These velocity filters segregate the various frequencies of the doppler spectrum which thereafter are detected as indicated in blocks 62 and passed into sampling circuits 63. The sampling circuits 63 can involve an electronic commutation arrangement such as is taught in FIG. 4 of the U.S. Pat. to R. H. Dicke No. 2,535,274 issued Dec. 26, 1950. In that figure, the gate & switch elements 61–64 and the sweep driver 55 constitute an electronic commutation arrangement such as may be employed in the present invention for commutating the bank of filters to obtain information required for a proper presentation on the cathode ray tube 55. A cosine θ corrected sweep, operative at approximately 400 cycles per second as indicated in block 64, is used to sequentially sample the circuits of block 63 and at the same time is used as the radial sweep control for the cathode ray tube 55. Device 64 is akin to a saw-tooth generator involving a wave form that has a corrected slope to compensate for the trigonometric relationship between doppler frequency and the angle off the velocity vector. This trigonometric relationship is well known to that segment of the industry concerned with doppler radar generally. The sequentially sampled circuits in block 63 are used to control the target intensity by being applied to the control grid of the cathode ray tube. Thus, a picture is produced on the face of the cathode ray tube, the center of which is the point of highest doppler frequency and thus corresponds to that point on the earth's surface in line with the velocity vector of the missile. The remaining points along lines extending radially from the center on the face of the cathode ray tube relate to points angularly displaced from the velocity vector, the smaller the angle, the closer to the center of the face of the cathode ray tube. The reflected microwave energy in terms of quantity will be determined by the character of the target complex. Thus, the picture on the face of the cathode ray tube will vary insofar as intensity is concerned, dependent upon the character of the target complex. This enables the operator of the missile to view the picture and issue forth commands to the missile to correct or adjust its flight pattern.

Although the invention has been shown and described in terms of a preferred embodiment, nevertheless, various changes and modifications obvious to one skilled in the art are within the spirit, scope, and contemplation of the present invention. As one example, this invention is broad enough to be utilized as a mapping system in a manned vehicle, in which event no communication link would be necessary.

I claim:

1. A mapping system for use with an object moving relative to the earth comprising means mounted on the object to direct a beam of microwave energy at an area on the earth's surface and develop from reflected microwave energy a doppler spectrum, means to rotate said object to cause said beam to be scanned over said area, means to develop a signal related to the rotation of said object, means to transmit said doppler spectrum and said signal to a remote station, means at said remote station to receive said doppler spectrum and said signal, and means for resolving and displaying elements of said doppler spectrum along different radii of an indicator, said radii being determined by said signal related to the rotation of said object.

2. A mapping system for use with a vehicle traveling relatively to a portion of the surface of the earth illuminated by electro-magnetic energy, said system comprising a collecting antenna having a narrow fan-shaped amplitude pattern arranged to collect in the form of strips, energy reflected from said portion of the surface of the earth, means for rotating the antenna pattern about an axis approximately coincident with the velocity vector of the vehicle, means for establishing elements along each strip on the earth's surface, by virtue of the difference in velocity hence frequency along the strip, said differences in frequency existing as a consequence of the velocity of the vehicle with respect to the area being mapped, means for sequentially sampling the signal amplitude from said elements, means for providing a roll reference signal, and means for displaying the output of said sampling means along different radii of an indicator, said radii being determined by said roll reference signal.

3. A mapping system as defined in claim 2 in which said means for establishing elements along each strip and said indicator means are at a remote location, said remote location being coupled to said vehicle by means of a link functioning to transmit to the remote location, the doppler spectrum corresponding to the energy collected along a strip on the earth determined by said antenna pattern.

4. A mapping system as defined in claim 2 in which said means for establishing elements along each strip and said indicator are at a remote location, said remote location being coupled to said vehicle by means of a link functioning to transmit to the remote location, the doppler spectrum corresponding to the energy collected along a strip on the earth determined by said antenna pattern, and the rate of rotation of said pattern.

5. A mapping system for use with a vehicle traveling relatively to the surface of the earth, said system comprising means to direct a beam of microwave energy over an area on the earth's surface, a collecting antenna having a narrow fan-shaped amplitude pattern arranged to collect in the form of strips, the doppler spectrum reflected from said area on the earth's surface, means for rotating the antenna pattern about an axis approximately coincident with the velocity vector of said vehicle, means for establishing elements along each strip on the earth's surface, by virtue of the difference in velocity hence frequency along the strip, said differences in frequency existing as a consequence of the velocity of the vehicle with respect to the area being mapped, means for sequentially sampling the signal amplitude from said elements, means for providing a roll reference signal, and means for displaying the amplitude of the signal from said elements along different radii of an indicator, said radii being determined by said roll reference signal.

6. A mapping system as defined in claim 5 in which said means for establishing elements along each strip and said indicator means are at a remote location, said remote location being coupled to said vehicle by means of a link functioning to transmit to the remote location, the doppler spectrum corresponding to the energy collected along a strip on the earth determined by said antenna pattern.

7. A mapping system as defined in claim 5 in which said means for establishing elements along each strip and said indicator means are at a remote location, said remote location being coupled to said vehicle by means of a link functioning to transmit to the remote location, the doppler spectrum corresponding to the energy collected along a strip on the earth determined by said antenna pattern, and the rate of rotation of said pattern.

8. A mapping system as defined in claim 5 in which said means for establishing elements along each strip comprises a bank of graduated filters to resolve the doppler spectrum into its constituent components, and in which said indicator means comprise sampling circuits to sample the output of said filters simultaneously with the deflection along the radius of an indicator, said indicator means including means for indicating the intensity of the signals from said filters in the form of the brightness of the beam of electrons that describe the radius of the indicator.

9. A mapping system for use with a vehicle traveling relatively to the surface of the earth, said system comprising means to direct a beam of microwave energy over an area on the earth's surface, a collecting antenna having a narrow fan-shaped amplitude pattern arranged to collect in the form of strips, energy reflected from said area on the earth's surface, means for rotating the antenna pattern about an axis approximately coincident with the velocity vector of the vehicle, means to convert the spectrum at antenna frequency to a lower frequency by means of a reference frequency and a non-linear device, means for differentiating elements of said spectrum, said differentiation taking place by virtue of the difference in frequency of said elements of said spectrum corresponding to the difference in vehicle velocity relative to the elements along the strip, means for providing a roll reference signal, and means for displaying the output of said differentiating means along different radii of an indicator, said radii being determined by said roll reference signal.

10. A mapping system for use with a vehicle traveling relatively to a portion of the surface of the earth illuminated by electro-magnetic energy, said system comprising a collecting antenna having a narrow fan-shaped amplitude pattern arranged to collect in the form of strips, energy reflected from said portion of the surface of the earth, means for rotating the antenna pattern about an axis approximately coincident with the velocity vector of the vehicle, means to convert the spectrum at antenna frequency to a lower frequency by means of a reference frequency and a non-linear device, means for differentiating elements of said spectrum, said differentiation taking place by virtue of the difference in frequency of said elements of said spectrum corresponding to the differences in vehicle velocity relative to the elements along the strip, means for providing a roll reference signal, and means for displaying the output of said differentiating means along different radii of an indicator, said radii being determined by said roll reference signal.

11. A mapping system for use with a vehicle traveling relatively to a portion of the surface of the earth illuminated by electro-magnetic energy, said system comprising a collecting antenna having a narrow, fan-shaped amplitude pattern arranged to collect in the form of strips, energy reflected from said portion of the surface of the earth, means for rotating the antenna pattern about an axis approximately coincident with the velocity vector of the vehicle, means to convert the energy which exists over a spectrum at antenna frequency as a consequence of vehicle velocity to a lower frequency by means of a reference frequency and a non-linear device, means for providing roll reference information, a communication link transmitter for transmitting the spectrum and roll reference information to a remote station, receiving means at said remote station incorporating correlation detection and means to obtain the doppler spectrum and roll from said vehicle, means to compare the roll information with a roll reference signal, a bank of velocity filters to segregate the various frequencies of the doppler spectrum, detection means for detecting the signals from individual filters sampling circuits to sample the output from the detectors, means to sequence the sampling circuits and to act as the radial sweep control for the display device, said sequencially sampled circuits being used to control the target intensity, the beam of said display device being swept along the radius thereof starting at the center as the highest frequency filter is sampled, and progressing to the circumference as successive lower frequency filters are sampled.

12. A method of mapping terrain from a vehicle traveling relatively to the terrain comprising the steps of resolving the area to be mapped into strips by rotating a narrow fan-shaped antenna beam about an axis approximately coincident with the velocity vector of the vehicle, multiplying the reflected energy and a reference signal to generate a doppler spectrum in the vehicle, operating upon the doppler spectrum in order to resolve elements of area along the strip determined by the antenna pattern by applying the spectrum to a bank of graduated filters which select different frequencies, hence elements along the strip, sampling the amplitude at the output of the filters, and using the said output as an intensity control on an indicating device, the output of the indicating device being swept along the radius of the device starting at the center as the highest frequency filter is sampled, and progressing to the circumference as the lower frequency filters are sampled.

13. A mapping system for use in an object moving relative to a portion of the surface of the earth illuminated by electromagnetic energy, comprising means within said object to compare electromagnetic energy received from the illuminating means with energy of said illuminating means reflected by said portion of the earth's surface, means to extract from said comparing means the doppler frequency spectrum produced by said motion of object relative to said portion of earth's surface, means to confine for an interval of time said energy collection to that reflected from a selectable area of said portion of earth's surface, said selectable area being oriented within said portion of earth's surface so that specific frequency components of said doppler frequency spectrum can be uniquely identified with specific increments of said selectable area, means for varying the orientation of said collecting means to successively collect during successive intervals of time the reflected energy from succession of areas similar in shape to said selectable area, said successive areas lying within said portion of earth's surface, means to sense the orientation of said collecting means at each said interval of time, means to determine the signal level of each said specific frequency component of said doppler frequency spectrum during each said interval of time, means to relate each said signal level to a corresponding said increment of area for the purpose of creating pictorial information, and means for pictorially depicting said portion of earth's surface.

14. The mapping system as defined in claim 13 in which said illuminating means is contained within said object.

15. The mapping system as defined in claim 13 including means for determining the relative angular positions between one or more reflecting objects within said portion of the earth's surface and the intercept of said object's velocity vector with the earth, and means to generate error signals as a function of said relative angular positions, for the purpose of controlling the trajectory of said object.

* * * * *